July 15, 1958

B. V. STEVENS 2,843,009

ADJUSTABLE EPISCOPIC ILLUMINATION
FOR THE CONTOUR PROJECTOR

Filed Oct. 14, 1954

Bert V. Stevens
INVENTOR.

BY Daniel I. Mayne
F. W. Emerson Holmes
ATTORNEYS

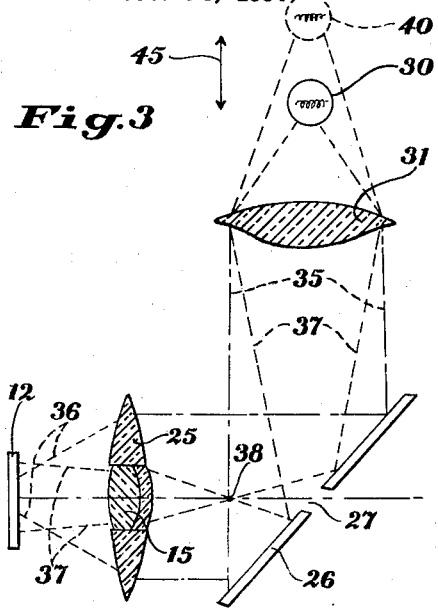
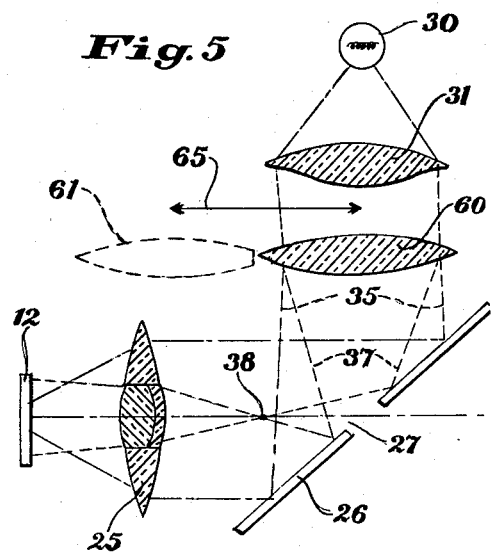
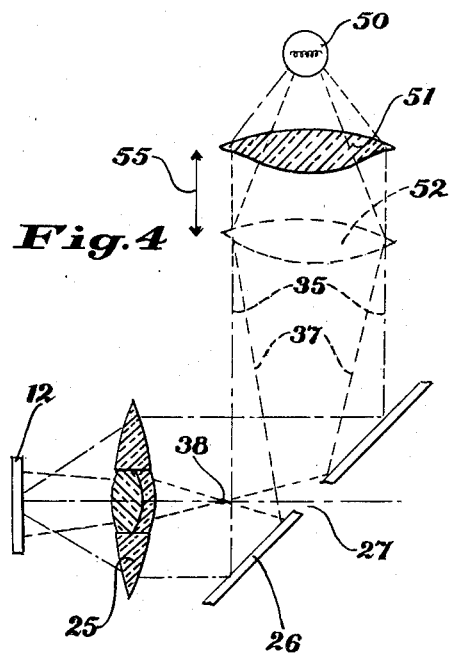
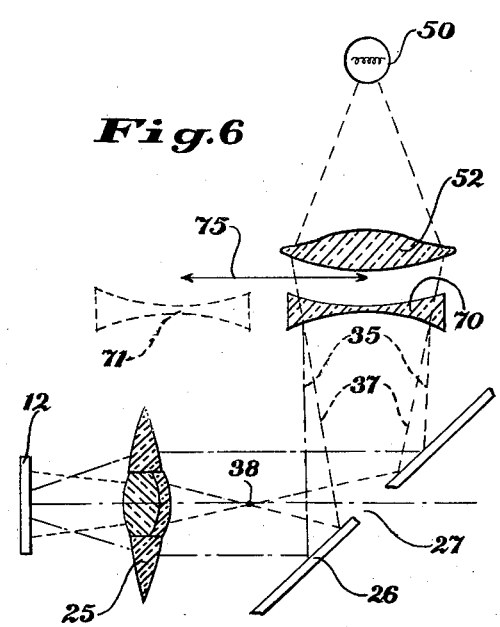
Bert V. Stevens
INVENTOR.

July 15, 1958  B. V. STEVENS  2,843,009
ADJUSTABLE EPISCOPIC ILLUMINATION
FOR THE CONTOUR PROJECTOR
Filed Oct. 14, 1954  3 Sheets-Sheet 3
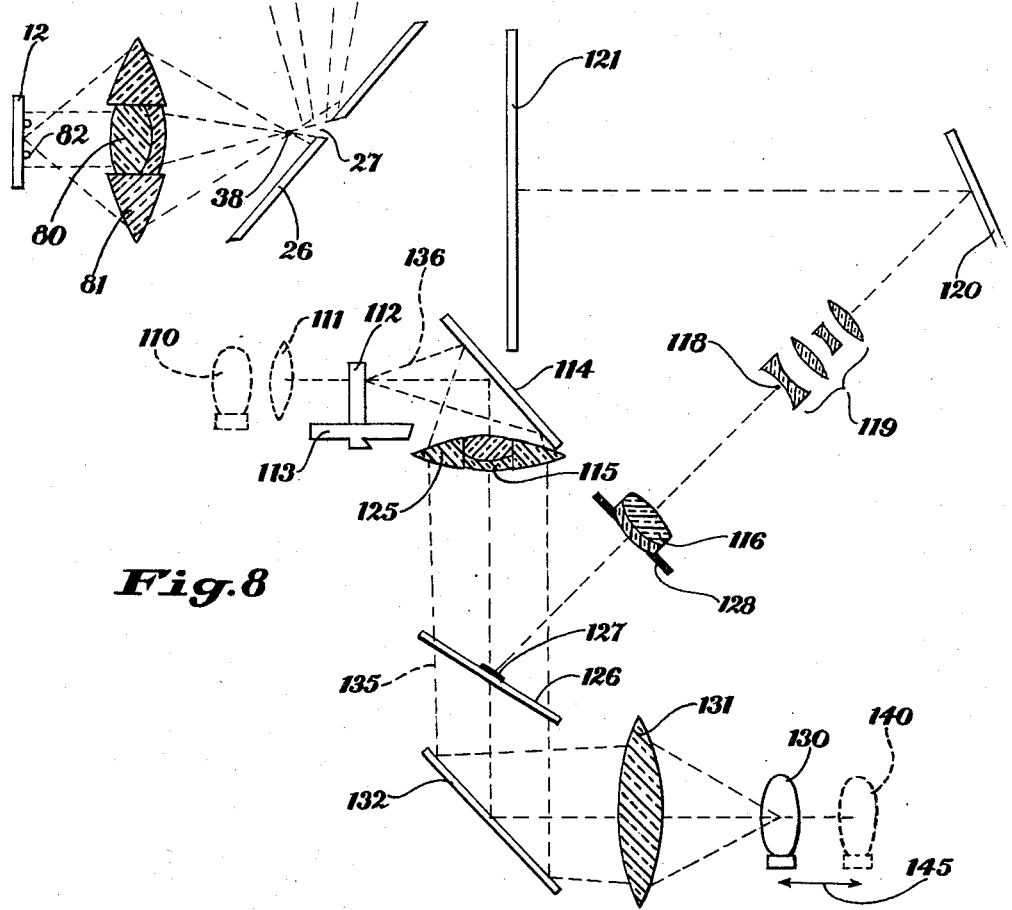
Bert V. Stevens
INVENTOR.
BY
ATTORNEYS

United States Patent Office 2,843,009
Patented July 15, 1958

2,843,009

ADJUSTABLE EPISCOPIC ILLUMINATION FOR THE CONTOUR PROJECTOR

Bert V. Stevens, Rochester, N. Y., assignor to Eastman Kodak Company, Rochester, N. Y., a corporation of New Jersey Application October 14, 1954, Serial No. 462,223

3 Claims. (Cl. 88—24)

This invention relates to profile projectors of the type used in machine shops for the inspection of small parts. It relates particularly to episcopic comparators such as described in U. S. 2,552,280 Hudak.

It is the object of the invention to provide a maximum brightness in the episcopic system without adversely affecting the image quality. In a preferred embodiment of the invention the intensity and type of the episcopic illumination may be varied from a very high intensity and concentrated beam to a low intensity and diffuse beam.

The invention is applied to telecentric lens systems in which light is reflected from the telecentric stop in the rear focal plane of the first objective of the system through this first objective to illuminate the object. As shown in the Hudak patent mentioned above, a reflector oblique to the optic axis with an optical aperture as the telecentric stop is a convenient way of providing this episcopic illumination. Alternatively the telecentric stop may be a reflector spot and the episcopic illumination may be transmitted around this spot as described in my copending application Serial No. 446,826 filed July 30, 1954, now U. S. Patent 2,804,800. Also the present invention is particularly useful with the stereo system described in copending application Serial No. 440,314 filed June 30, 1954, by A. R. Fultz and myself since in the latter system the telecentric stops are off-axis leaving the axial portion fully available for use in the present invention which has to do with the episcopic illumination feature.

According to the invention an annular lens element of relatively inexpensive construction surrounds the first objective to transmit the marginal portions of the episcopic beam from the reflector. This annular lens need not be exactly at the plane of the first objective lens but may be placed slightly in front of or behind the first objective lens. These marginal portions are supplementary to the paraxial portion passing through the first objective itself and all portions combine to illuminate the object. The first objective must, of course, be of high quality since it cooperates in forming the image of the object under test. In general any light from the object passing back through the annular lens element will strike the reflector and not pass through the telecentric stop therein. However, when the object is fairly large, there may be some light passing from the annular lens through the telecentric stop. According to the invention means are provided for preventing this light from reaching the viewing screen on which the image is formed by the main lens system. For example, in a telecentric lens system in which one relay stage consists of two objectives separated by the sum of their focal lengths with the telecentric stop in the common focal plane, the second objective is of such size that it receives light only from the first objective and does not receive any light from the annular lens surrounding the first objective. The mount for the second objective thus acts as the means for preventing light from the annular lens reaching the screen.

A first preferred embodiment of the invention provides a choice between collimated illumination which is sometimes necessary when making precise measurements, and a wide, concentrated cone of light which is extremely useful when examining small, highly curved, contours. In the latter case the wide angle of illumination striking the curved surfaces allows much more of the specularly reflected light to get back into the imaging system. Finally we have the case where there are small contours interspersed with flat specular areas and for this there is a second preferred embodiment which provides both collimated and highly concentrated conical illumination simultaneously.

According to the first preferred embodiment of the invention, a lamp and condenser lens or mirror system provides the source of episcopic illumination. A beam of light from this system strikes the reflector and is reflected both through and around the first objective of the projection system. When this beam of light striking the reflector is parallel or collimated, it is focused by the first objective to form a concentrated spot of light on the object. When the beam striking the reflector is convergent so as to come to focus in the first objective, it diverges from the latter and is of quite low intensity as it strikes the object. As the beam is made still more convergent and is approximately focused on the reflector, it diverges therefrom as it passes to the first objective. The beam is then collimated by the first objective giving the collimated illumination required for precise measurements.

It happens that this setting of the system may illuminate the object perhaps a little brighter than when the light focused on the objective but this is offset by the increased loss of light through the aperture itself. In fact, if the telecentric aperture is large enough and the spot of light focused thereon is small enough, all of the light passes through the stop and none is reflected to the first objective. Thus the intensity of illumination may be reduced all the way to zero.

In practice, the concentration of light on the mirror is larger than the telecentric stop and the collimation of the light is the important characteristic of the limiting setting rather than the low intensity. It should be noticed that this adjustable system has the greatest effective range when the first objective and the annular lens surrounding it have approximately the same focal length. Under such conditions, both lenses tend to concentrate the light from a parallel beam onto the object and then as the focus of the beam is changed, both lenses tend to spread the light more diffusely.

On the other hand, the second preferred embodiment of the invention has an annular lens with half the focal length of the objective which it surrrounds. In this case when the light is collimated by the objective to illuminate flat surfaces, the annular lens focuses a concentrated cone on the object to illuminate any small contours on the overall flat surface.

As far as the present invention is concerned, it does not matter what system is used to change the focus of the illuminating beam. A condenser lens or mirror may be moved relative to a lamp or the lens or mirror may be fixed and the lamp moved or both may be fixed and a supplementary lens either positive or negative may be added to change the illumination conditions from one extreme to the other without intermediate values. Moving either the condenser lens or the lamp has the advantage of giving a full range of intensities. When the work piece or object is approximately in the front focal plane of the first objective, one extreme of the preferred range produces the parallel or collimated beam on the reflector. The other extreme produces a convergent beam focused approximately between the first objective and the telecentric stop. That is, it is focused approximately at the objective or approximately at the stop or anywhere in between. The focus could be ahead of the stop or beyond (i. e., in front of) the front objective.

The invention will be more fully understood from the following description when read in connection with the accompanying drawings, in which:

Figs. 3 to 6, inclusive, illustrate schematically four illuminating systems of variable or adjustable focus.

Fig. 7 similarly illustrates a second preferred embodiment of the invention which provides both concentrated and collimated episcopic illumination.

Fig. 8 is a vertical section partly schematic of a different form of contour projector according to the present invention.

Figure 1:
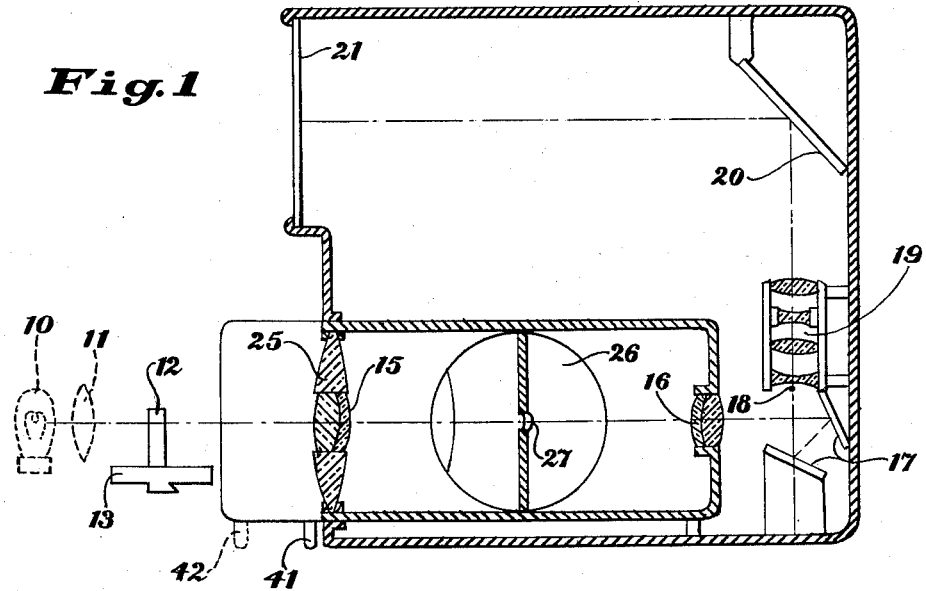
Fig. 1 is a vertical section partly schematic of a contour projector according to the invention.
Figure 2:
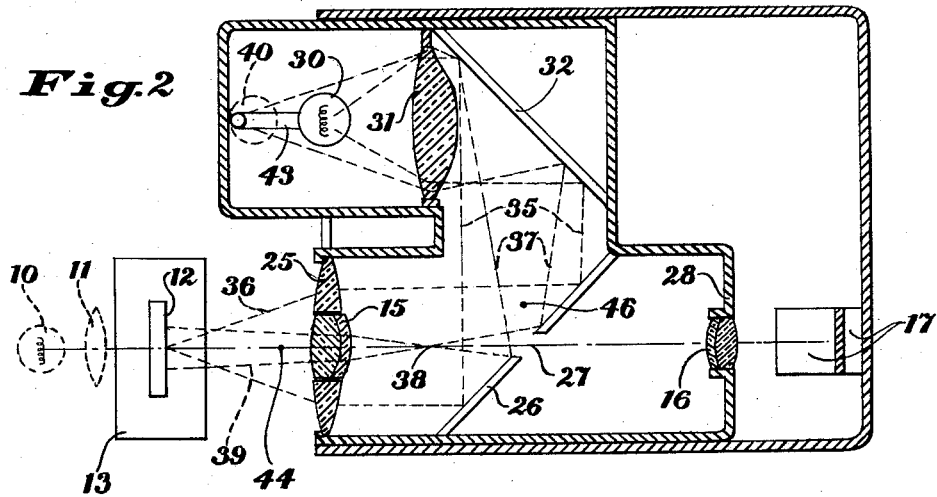
Fig. 2 is a horizontal section, also partly schematic, of the projector shown in Fig. 1.

In Figs. 1 and 2, the lamp 10 and condenser lens 11 shown in broken lines, represent the usual diascopic illuminating system associated with contour projectors. However, the present invention is not concerned with the diascopic illumination in any way but rather is confined to the episcopic illumination system. Light from an object 12 carried on a work table 13 is relayed by an afocal telecentric lens system made up of objectives 15 and 16 separated by the sum of their focal lengths and reflectors 17 to form an aerial image 18. This image is relayed by a lens 19 and a mirror 20 into focus on a rear projection viewing screen 21. A mirror 26 is positioned obliquely with respect to the optic axis of the lenses 15 and 16, with an optical aperture 27 located in the common focal plane of the lenses 15 and 16 so that this aperture 27 acts as the telecentric stop of the relay lens system. Light from a lamp 30 and a condenser lens system 31, as shown in Fig. 2, is reflected by a mirror 32 onto the reflector 26. This beam is then reflected through (and in the present invention also around) the first objective 15 to illuminate the object 12 episcopically. According to the invention this high quality first objective 15 is surrounded by an annular lens element 25 of relatively low quality. This permits a much larger illumination beam to be directed onto the object 12. In this connection it should be noted that without the annular lens 25 efforts to increase the intensity of illumination by focusing more light through the lens 15 either causes the light to spread after it passes through the lens 15 or concentrates most of the beam from the lamp 30 on the aperture 29 so that it is lost and is not reflected back through the first objective. The annular lens 25 tends to use the marginal parts of the beam much more efficiently and hence to use the marginal (i. e., not paraxial) parts of the reflector 26.

According to a preferred embodiment of the invention the illumination beam may be adjusted from a concentrated one represented by lines 36 to a diffuse diverging one represented by lines 39 as they strike the object 12.

In the arrangement shown light from the lamp 30 is collimated by the condenser 31 to give parallel light as represented by rays 35. This beam of parallel light is focused by the annular lens 25 and also by the first objective 15 to form a concentrated spot on the object. In this embodiment the lens 25 should have approximately the same focal length as the objective 15 so that the paraxial and marginal portions of the beam are either both concentrated or both rendered parallel or divergent.

When the lamp 30 is moved to the position shown by broken lines 40, the condenser 31 focuses the beam as indicated by the rays 37 at the point 38, approximately between the lens 15 and the stop 27. This limit of the adjustment could actually focus the light in the lens 15 or right on the aperture 27, or for that matter anywhere between a point slightly in front of the lens 15 to a point 46 ahead of the aperture 27. Maximum diffusion and minimum intensity (except for the loss of light through the aperture 27) would be obtained when the focal point 38 falls approximately in the lens 15. However, due to the light loss through the aperture 27, the intensity continues to fall off as the focal point 38 moves toward the aperture 27. Thus the limiting position 40 of the lamp may be anywhere conjugate to a point approximately between the lens 15 and the aperture 27.

In the arrangement shown the mount for the lamp 30 includes a handle 41 extending through a slot 43 in the housing. As the handle 41 is moved to the position shown in Fig. 1 by broken lines 42, the lamp 30 moves to the position shown by broken lines 40.

It should be noted that when the light is reflected by the object 12 through the lens 15 it passes through the stop 27 to the lens 16. However, light from the object passing through the annular lens 25 is prevented either by the mirror 26 or by the mount 28 of the lens 16 from reaching the screen 21. Any light from the annular lens 25 which passes through the aperture stop 27 falls outside the lens 16.

Fig. 3 shows the same arrangement as shown in Figs. 1 and 2 except that the mirror 32 has been omitted. Movement of the lamp 30 from one limit of adjustment to the other is represented by a double-headed arrow 45.

An alternative arrangement is shown in Fig. 4 in which the lamp 50 is held in a fixed position. A condenser 51 collimates the light from this lamp providing the parallel beam (rays 35). When the condenser 51 is moved to the position 52, light from the lamp 50 is rendered convergent as represented by the rays 37. The adjustment of the condenser lens between positions 51 and 52 is represented by the double-headed arrow 55. When the lens is in the position 52, the system corresponds to Fig. 3 with the lamp in the position 40.

In Fig. 5 both the lamp and lens remain fixed in the positions represented by 30 and 31. When acting alone this system provides the parallel beam represented by rays 35. When a supplemental positive lens 60 is moved from the position 61 as indicated by the double-headed arrow 65 to the position indicated at 60, this parallel beam is focused to form the convergent rays 37. This is not a continuously variable system but rather gives just the two extremes in illumination. However, it is more satisfactory for many purposes merely to have such two conditions and to mount the supplemental lens 60 on a simple slide or turret.

Similarly, as shown in Fig. 6, the lamp may be fixed in the position 50 and the condenser lens fixed in the position 52 so that alone they provide the convergent beam represented by the rays 37. In this case a supplemental negative lens moved from the position 71 to the position 70, as indicated by the double-headed arrow 75, renders this convergent beam parallel again, as represented by rays 35, thus giving the two conditions of illumination discussed at length above. In every case, the point 38 may be anywhere on the axis approximately between the objective 15 and the aperture 27.

When the above described invention is applied to the stereo system in copending application 440,314 mentioned above, the light represented by the rays 37 may be brought to focus exactly on the reflector 26 without losing any of the axial light, because in the stereo case the aperture 27 is made up of two parts slightly off axis to give the stereo effect. Of course, the light source indicated at 30, 40 or 50 in Figs. 2 to 6 is so large that its image, even when focused exactly at the mirror 26, is larger than the aperture 27 but, when the aperture 27 is on axis, some light is lost through it. This is not true in the stereo case and hence the collimated illumination is much brighter in the stereo embodiment.

In Fig. 7, a second preferred embodiment of the invention is illustrated in which the annular lens 81 has a focal length approximately half that of the objective 80 which it surrounds. In this case, when the condenser lens is in the position 52, the objective 80 provides collimated illumination of the object 12 which is primarily a flat object. At the same time, however, the annular lens 81 provides a very wide cone of light which illuminates the sides of small details 82 and specular illumination from these sides of the details 82 passes through the objective 80 into the image optical system. Otherwise the only specular reflection from the details 82 reaching the objective 80 would be that from the front of these details. The sides would appear quite dark.

Fig. 8 corresponds to Figs. 1 and 2 but illustrates the application of the invention to the reflector spot system employed in the contour projector described in copending application 446,826 also mentioned above. The lamp 110 and lens 111 for diascopic illumination of the object 112 are shown by broken lines since they are not used in the present invention. The object 112 is carried on a support 113. Light from this object 112 is reflected by a mirror 114 through a relay lens consisting of lenses 115 and 116 and a small reflector spot 127 carried on a transparent glass sheet 126. The lenses 115 and 116 form an aerial image at the point 118 which is focused by an objective 119 and a mirror 120 on a viewing screen 121. The area of the reflector spot 127 is such that it acts as the telecentric stop of the relay lens (115 and 116). Light from an adjustable lamp 130 is collimated by a condenser lens 131 and reflected by a mirror 132, as indicated by the rays 135 through the transparent sheet 126 around the reflector spot 127. This light is focused by the objective 115 and an annular lens 125 surrounding this objective to form a cone of light represented by the rays 136 converging on the object 112. The light reflected through the objective 115 is reflected by the spot 127 into the image forming system. Light from the object 112 passing through the annular lens 125 does not enter the objective 116, but either passes through the transparent support 126 or is reflected onto the mount 128 of the lens 116.

As indicated by the double-headed arrow 145 the lens 130 may be moved to the position 140 to change the focus of the illumination beam in the same way as in Fig. 3.

I claim:

1. An optical system for projecting an image of an episcopically illuminated object, comprising a viewing screen, a plurality of optically aligned objectives for receiving light from the object and for forming an image thereof on the screen including a first objective for receiving the light from the object, a plane reflector located at the rear focal plane of the said first objective oblique to the axis thereof with an axial aperture smaller in diameter than said first objective and constituting a telecentric stop for the first objective, so that light from the first objective goes through said telecentric stop to the rest of the image forming objectives, a lamp and light condenser system optically at one side of the image forming system and positioned to send a beam of light to the plane reflector to be reflected both through and around said first objective to illuminate the object episcopically, an annular positive lens element surrounding the first objective to transmit and converge the marginal portions of said beam, and means for preventing any light which is reflected from the object through the annular lens from reaching the screen.

2. An optical system for projecting an image of an episcopically illuminated object, comprising a viewing screen, a plurality of optically aligned objectives for receiving light from the object and for forming an image thereof on the screen including a first objective for receiving the light from the object, a plane reflector located at the rear focal plane of the said first objective oblique to the axis thereof with an axial aperture smaller in diameter than said first objective and constituting a telecentric stop for the first objective, so that light from the first objective goes through said telecentric stop to the rest of the image forming objectives, a lamp and light condenser system optically at one side of the image forming system and positioned to send a beam of light to the plane reflector to be reflected both through and around said first objective to illuminate the object episcopically, an annular positive lens element of approximately the same focal length as the first objective, surrounding the first objective to transmit and converge the marginal portions of said beam, means for preventing any light which is reflected from the object through the annular lens from reaching the screen and means for adjusting the focus of the lamp and condenser system from a setting which makes the beam of light approximately collimated as it reaches the plane reflector to a setting in which the beam is focused approximately between the first objective and the aperture stop.

3. An optical system for protecting an image of an episcopically illuminated object, comprising a viewing screen, a plurality of optically aligned objectives for receiving light from the object and for forming an image thereof on the screen including a first objective for receiving the light from the object, a plane reflector located at the rear focal plane of the said first objective oblique to the axis thereof with an axial aperture smaller in diameter than said first objective and constituting a telecentric stop for the first objective, so that light from the first objective goes through said telecentric stop to the rest of the image forming objectives, a lamp and light condenser system optically at one side of the image forming system and positioned to send a beam of light to the plane reflector to be reflected both through and around said first objective to illuminate the object episcopically, an annular positive lens element with approximately ½ the focal length of the first objective, surrounding the first objective to transmit and converge the marginal portions of said beam, said condenser system focusing the lamp approximately in the plane of the telecentric stop, whereby it is refocused by the annular lens approximately at the object and means for preventing any light which is reflected from the object through the annular lens from reaching the screen.

References Cited in the file of this patent

UNITED STATES PATENTS

| | | |
|---|---|---|
| 1,840,448 | Heine | Jan. 12, 1932 |
| 1,935,444 | Heine | Nov. 14, 1933 |
| 1,943,509 | Bauersfeld | Jan. 16, 1934 |
| 1,996,920 | Hauser | Apr. 9, 1935 |
| 2,004,806 | Ellestad | June 11, 1935 |
| 2,103,230 | Benford | Dec. 28, 1937 |
| 2,155,248 | Adams | Apr. 18, 1939 |
| 2,625,076 | Nosco | Jan. 13, 1953 |